United States Patent
Saito et al.

(10) Patent No.: US 10,483,041 B2
(45) Date of Patent: Nov. 19, 2019

(54) MONOLITHIC CERAMIC CAPACITOR AND STRUCTURE FOR MOUNTING THE SAME

(71) Applicant: Murata Manufacturing Co., Ltd., Nagaokakyo-shi, Kyoto-fu (JP)

(72) Inventors: Yoshito Saito, Nagaokakyo (JP); Satoshi Matsuno, Nagaokakyo (JP); Shinji Otani, Nagaokakyo (JP); Tomochika Miyazaki, Nagaokakyo (JP); Yasuhiro Nishisaka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 278 days.

(21) Appl. No.: 14/668,220

(22) Filed: Mar. 25, 2015

(65) Prior Publication Data

US 2015/0279568 A1    Oct. 1, 2015

(30) Foreign Application Priority Data

Mar. 27, 2014  (JP) ................. 2014-065454

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |
| *H01G 4/252* | (2006.01) |
| *H01G 4/248* | (2006.01) |
| *H01G 4/008* | (2006.01) |

(52) U.S. Cl.
CPC ............ *H01G 4/30* (2013.01); *H01G 4/0085* (2013.01); *H01G 4/1227* (2013.01); *H01G 4/232* (2013.01); *H01G 4/248* (2013.01)

(58) Field of Classification Search
CPC .......... H01G 4/30; H01G 4/232; H01G 4/252; H01G 4/012; H01G 4/12
USPC ............ 361/321.1, 306.1, 301.4, 303, 306.3, 361/321.2
See application file for complete search history.

(56) References Cited

U.S. PATENT DOCUMENTS

| | | | |
|---|---|---|---|
| 2009/0086406 A1* | 4/2009 | Lee ................. | H01G 4/228 361/306.3 |
| 2011/0205684 A1* | 8/2011 | Yamamoto ............ | H01G 4/232 361/305 |
| 2013/0094123 A1* | 4/2013 | Ahn ................. | H01G 4/30 361/321.1 |

FOREIGN PATENT DOCUMENTS

| | | |
|---|---|---|
| JP | 2000-040635 A | 2/2000 |
| JP | 2000-049034 A | 2/2000 |
| JP | 2000-077258 A | 3/2000 |
| JP | 2011-108874 A | 6/2011 |
| KR | 2013-0006800 A | 1/2013 |

* cited by examiner

*Primary Examiner* — Jenny L Wagner
*Assistant Examiner* — Arun Ramaswamy
(74) *Attorney, Agent, or Firm* — Arent Fox LLP (57) ABSTRACT

A first outer electrode and first inner electrodes are supplied with an anode potential and a second outer electrode and second inner electrodes are supplied with a cathode potential when a monolithic ceramic capacitor is mounted and in use. The first outer electrode supplied with the anode potential has a thickness that is greater than a thickness of the second outer electrode supplied with the cathode potential.

13 Claims, 7 Drawing Sheets

MONOLITHIC CERAMIC CAPACITOR AND STRUCTURE FOR MOUNTING THE SAME

BACKGROUND OF THE INVENTION

1. Field of the Invention

The present invention generally relates to monolithic ceramic capacitors and structures for mounting the same and, more particularly, to an improvement that achieves both size reduction and improved moisture-resistance reliability of monolithic ceramic capacitors.

2. Description of the Related Art

Reliability under a high-temperature high-humidity loaded environment, that is, moisture-resistance reliability, is one of important required characteristics of monolithic ceramic capacitors. Decreased moisture-resistance reliability is more likely to cause a decrease in insulation resistance of monolithic ceramic capacitors under a high-temperature high-humidity loaded environment.

Hitherto, various improvements have been attempted in order to improve moisture-resistance reliability of monolithic ceramic capacitors. Many of such improvements are directed toward material compositions of a conductive paste used to form outer electrodes and structures of the outer electrodes. A presumable reason for this is as follows. Moisture often intrudes into a multilayer body which is a main body of monolithic ceramic capacitors from surfaces of the multilayer body having lead portions of inner electrodes disposed thereon. It has been considered that blocking moisture intrusion with outer electrodes that are formed to cover the lead portions of the inner electrodes is the most effective way to prevent such moisture intrusion.

For example, Japanese Unexamined Patent Application Publication Nos. 2000-40635, 2000-49034, and 2000-77258 describe a material composition of a conductive paste used to form outer electrodes or a structure of the outer electrodes that is effective to improve moisture-resistance reliability.

More specifically, Japanese Unexamined Patent Application Publication No. 2000-40635 describes a material composition used to form outer electrodes. This material composition allows reaction layers which have a certain thickness and can contribute to improvement in moisture-resistance reliability to be formed between dielectric ceramic layers included in a multilayer body and the respective outer electrodes.

Japanese Unexamined Patent Application Publication No. 2000-49034 focuses on porosity rates of outer electrodes in order to improve moisture-resistance reliability and describes particle diameters of metal powder contained in conductive pastes and a multilayer structure of the outer electrodes for achieving desired porosity rates.

Japanese Unexamined Patent Application Publication No. 2000-77258 describes an average particle diameter of metal particles and a glass distribution area ratio at surfaces of outer electrodes for improving moisture-resistance reliability.

There is also a desire for smaller monolithic ceramic capacitors in order to implement high-density packaging while maintaining an electrostatic capacity thereof. To meet such a desire, for example, reducing a thickness of outer electrodes is effective. Reducing a thickness of outer electrodes, and thereby reducing the material cost of the outer electrodes can also contribute to a reduction in the overall cost of monolithic ceramic capacitors.

However, it is easily presumed that a reduced thickness of outer electrodes, which have a role for blocking moisture intrusion into a multilayer body as described before, leads to the decreased moisture-resistance reliability.

SUMMARY OF THE INVENTION

Accordingly, it is an object of the present invention to provide monolithic ceramic capacitors and structures for mounting the same that can reduce the cost while maintaining high moisture-resistance reliability.

A motivation for the present invention can be found from findings obtained by the inventers from experiments described below.

Samples of monolithic ceramic capacitors, that is, a sample A that includes outer electrodes having a relatively large thickness and a sample B that includes outer electrodes having a thickness that is one-quarter the thickness of the outer electrodes of the sample A were prepared by forming the outer electrodes through baking of a conductive paste and plating. A high-temperature high-humidity loaded accelerated test was carried out on the samples A and B while applying a certain voltage to the samples A and B, and a leakage current was measured. In this way, insulation resistance was evaluated. As a result, decreased insulation resistance was observed only in the sample B. This indicates that thickness of outer electrodes influences moisture-resistance reliability.

A plurality of samples B for which decreased insulation resistance was observed were inspected for structural defects. The inspected samples included both samples for which no structural defects were observed and samples for which a crack was observed. This indicates that structural defects do not necessarily serve as a cause of decreased insulation resistance.

From the indications described above, the inventors considered that that thickness of the outer electrodes that has been made thin enough to allow intrusion of water vapor into a multilayer body resulted in decreased insulation resistance in the sample B. The inventors also presumed that water vapor intruded into the multilayer body via surfaces of the multilayer body having the outer electrodes thereon, that is, surfaces to which inner electrodes extend.

To determine whether the above presumption is correct, the moisture transmission property of dielectric ceramic layers that constitute the multilayer body was evaluated in accordance with a test standard ASTM F1249 which is for use in measurement of a water vapor transmission rate of plastic films and plastic sheets. The evaluation result confirmed that the above presumption was correct. Note that the above presumption does not necessarily exclude a possibility of water vapor intruding from surfaces of the multilayer body other than those to which the inner electrodes extend. For example, in the case where dielectric ceramic layers which serve as outer layer portions of the multilayer body have a relatively high porosity rate, water vapor may intrude into the multilayer body from surfaces other than those to which the inner electrodes extend.

The inventors then hypothesized that water vapor that can cause a decrease in insulation resistance might have different effects on the operation state of monolithic ceramic capacitors depending on whether the water vapor has intruded from an outer electrode serving as an anode or from an outer electrode serving as a cathode. The inventors conducted the following experiment.

A sample of monolithic ceramic capacitors, that is, a sample C that includes a first outer electrode having an ordinary thickness and a second outer electrode that opposes the first outer electrode and has a thickness that is one-quarter the ordinary thickness was prepared. A high-temperature high-humidity loaded accelerated test was carried out on the sample C while applying a certain voltage to the sample C, and a leakage current was measured. In this way, insulation resistance was evaluated. At this time, a leakage current was measured for a first case where the first and second outer electrodes are respectively supplied with anode and cathode potentials from a leakage current measurement system and a second case where the second and first outer electrodes are respectively supplied with the anode and cathode potentials. As a result, decreased insulation resistance was not observed in the first case but was observed in the second case.

This indicates that water vapor that intrudes from an outer electrode supplied with the cathode potential does not cause a decrease in insulation resistance but water vapor that intrudes from an outer electrode supplied with the anode potential greatly contributes to a decrease in insulation resistance.

From this experimental result, it can be considered that electrolysis of water ($H_2O$) occurs somewhere in the monolithic ceramic capacitor because of intrusion of water vapor into the multilayer body of the monolithic ceramic capacitor to which a voltage is being applied. It is not clear whether water vapor that has intruded into the multilayer body has condensed to liquid water but electrolysis of water ($H_2O$) is generally denoted by Expressions below.

Anode: $H_2O \rightarrow 2H^+ + \frac{1}{2}O_2 + 2e^-$ (1)

Cathode: $H_2O + e^- \rightarrow \frac{1}{2}H_2 + OH^-$ (2)

In sum, it can be considered in the following way. Water vapor ($H_2O$) at the anode among water vapor that has intruded into the multilayer body from surfaces to which inner electrodes extend undergoes electrolysis at an interface between dielectric ceramic layers and the anode, and consequently hydrogen ions are generated (see Expression (1) above). The generated hydrogen ions diffuse over the multilayer body and cause a decrease in insulation resistance. Note that electrolysis occurs at a portion where the inner electrodes serving as the anode oppose the inner electrode serving as the cathode. However, a lead portion which extends from an inner electrode to be connected to an outer electrode does not oppose its corresponding inner electrode, and thus electrolysis does not occur there.

From the experiments described above, the inventors have obtained knowledge that improving moisture-resistance reliability at the anode can exert a sufficient effect and have come up with the present invention.

An aspect of the present invention is directed toward a monolithic ceramic capacitor including a multilayer body including a plurality of dielectric ceramic layers that are stacked on one another and inner electrodes each disposed along a corresponding one of a plurality of interfaces between the dielectric ceramic layers, and at least one first outer electrode and at least one second outer electrode disposed at a first position and a second position on a surface of the multilayer body, respectively, the first position and the second position being different positions, the surface being a surface extending in a stacking direction in which the dielectric ceramic layers are stacked on one another. The inner electrodes include first inner electrodes and second inner electrodes that are alternately arranged in the stacking direction and that extend to the first position and the second position so as to be electrically connected to the first outer electrode and the second outer electrode, respectively. The first outer electrode and the first inner electrodes are supplied with an anode potential and the second outer electrode and the second inner electrodes are supplied with a cathode potential when the monolithic ceramic capacitor is mounted and in use. The monolithic ceramic capacitor includes the following configuration in order to address the above-described technical challenges.

Specifically, the monolithic ceramic capacitor according to the aspect of the present invention includes a moisture-resistance reliability improving means capable of providing a higher moisture-resistance reliability at an anode which includes the first outer electrode and the first inner electrodes supplied with the anode potential than at a cathode which includes the second outer electrode and the second inner electrodes supplied with the cathode potential.

As described above, improving moisture-resistance reliability only at the anode can exert a sufficient effect.

In a first embodiment, the moisture-resistance improving means may include a moisture-intrusion suppressing means for preventing the moisture more highly from intruding into an interface between any of the dielectric ceramic layers and at least one of the first outer electrode and the first inner electrodes at the anode than intruding into an interface between any of the dielectric ceramic layers and at least one of the second outer electrode and the second inner electrodes at the cathode. If intrusion of moisture is suppressed at the anode, generation of hydrogen ions due to electrolysis of water can also be suppressed.

In a first more specific example, the moisture-intrusion suppressing means may include a configuration in which the first outer electrode has a thickness that is greater than a thickness of the second outer electrode, thicker outer electrode can hinder moisture existing outside from reaching a surface of a multilayer body to which inner electrodes extend. Implementation of the moisture-intrusion suppressing means by making the first outer electrode have a greater thickness than the second outer electrode eliminates a need to make the second outer electrode thicker and thus can contribute to size reduction of monolithic ceramic capacitors.

Note that the above-described state where the first outer electrode has a greater thickness than the second outer electrode does not encompass a difference in thickness within a margin of error which can inevitably occur in industrial manufacturing. The same applies to other embodiments.

In the first example, more preferably, the first outer electrode may have a thickness of about 2 μm or greater on the surface of the multilayer body that extends in the stacking direction in which the dielectric ceramic layers are stacked on one another, and the second outer electrode may have a thickness that is about half the thickness of the first outer electrode or less on a surface of the multilayer body that extends in the stacking direction. Here, a thickness of an outer electrode is a thickness measured from a point where inner electrodes touch the outer electrode.

In a second more specific example, the moisture-intrusion suppressing means may include a configuration in which the first outer electrode has a water vapor transmission rate that is lower than a water vapor transmission rate of the second outer electrode. A lower water vapor transmission rate of an outer electrode can hinder moisture existing outside from reaching a surface of a multilayer body to which inner electrodes extend.

In a third more specific example, the moisture-intrusion suppressing means may include a configuration in which the first outer electrode has an amount of intruding water vapor that is less than an amount of intruding water vapor of the second outer electrode. Making an amount of water vapor that intrudes from an outer electrode smaller can hinder moisture existing outside from reaching a surface of a multilayer body to which inner electrodes extend.

In the case where the monolithic ceramic capacitor is of a two-port type, the multilayer body may have a substantially rectangular-parallelepiped shape having a first principal face and a second principal face that oppose each other and that extend in a direction of principal faces of the dielectric ceramic layers, a first side face and a second side face that oppose each other and that extend in the stacking direction in which the dielectric ceramic layers are stacked on one another, and a first end face and a second end face that oppose each other. The first outer electrode and the second outer electrode may be disposed on the first end face and the second end face, respectively. The first end face and the second inner electrodes may be disposed with a first length-direction gap interposed therebetween, and the second end face and the first inner electrodes may be disposed with a second length-direction gap interposed therebetween. In this case, in a fourth more specific example, the moisture-intrusion suppressing means may include a configuration in which the first length-direction gap is greater than the second length-direction gap.

In the fourth example, more preferably, a ratio of a dimension of the first length-direction gap to a dimension of the second length-direction gap may be made greater than 6.

In the case where the monolithic ceramic capacitor is of a multi-port type, the first outer electrode may include a plurality of first outer electrodes and the second outer electrode may include a plurality of second outer electrodes, each of the inner electrodes may have a capacitance forming portion that oppose another inner electrode with a corresponding one of the dielectric ceramic layers interposed therebetween and a lead portion that extends from the capacitance forming portion and that is connected to a corresponding one of the first outer electrodes or of the second outer electrodes, each of the second inner electrodes may have a plurality of second lead portions each of which is connected to a corresponding one of the plurality of second outer electrodes, and each of the First inner electrodes may have at least one first lead portion that is connected to at least one of the first outer electrodes. In a fifth more specific example, the moisture-intrusion suppressing means may include a configuration in which the number of first lead portions is less than the number of second lead portions.

In a second embodiment, the moisture-resistance reliability improving means may include a hydrogen-ion generation suppressing means for making generation of hydrogen ions due to electrolysis of water that has intruded into an interface between any of the dielectric ceramic layers and at least one of the first outer electrode and the first inner electrodes less likely to occur at the anode than generation of hydrogen ions due to electrolysis of water that has intruded into an interface between any of the dielectric ceramic layers and at least one of the second outer electrode and the second inner electrodes at the cathode. If a voltage to be applied to inner electrodes having water thereon is made smaller, for example, by making dielectric ceramic layers have a greater thickness at the anode, generation of hydrogen ions due to electrolysis of water can also be suppressed.

The moisture-resistance reliability improving means may include a configuration in which both the inner electrodes disposed at one end and at the other end respectively in the stacking direction are the second inner electrodes. This embodiment can be used in combination with other embodiments.

An aspect of the present invention is also directed toward a structure for mounting the monolithic ceramic capacitor described above. The structure according to this aspect has a feature in which the above-described monolithic ceramic capacitor is mounted such that the first outer electrode is supplied with the anode potential and the second outer electrode is supplied with the cathode potential.

According to the aspects of the present invention, there is provided the moisture-resistance reliability improving means that can provide a higher moisture-resistance at the anode than at the cathode. Thus, moisture intrusion and generation of hydrogen ions due to electrolysis of moisture that has intruded can be suppressed at the anode. This consequently makes a decrease in insulation resistance due to diffusion of hydrogen ions less likely to be caused and thus allows monolithic ceramic capacitors have high moisture-resistance reliability. Note that moisture that intrudes includes, for example, moisture contained in a plating solution used in wet plating as well as water vapor contained in an outside environment, for example.

In addition, according to the aspects of the present invention, improving moisture-resistance reliability only at the anode can exert a sufficient effect. Thus, a configuration for improving moisture-resistance reliability can be omitted at the cathode. This configuration can consequently reduce a cost for improving moisture-resistance reliability and a cost of monolithic ceramic capacitors. In addition, in the case where moisture-resistance reliability is improved, for example, by increasing a thickness of an outer electrode, the first outer electrode alone is made thicker. This configuration thus can enable size reduction of monolithic ceramic capacitors, and a desire for high-density packaging can be met.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
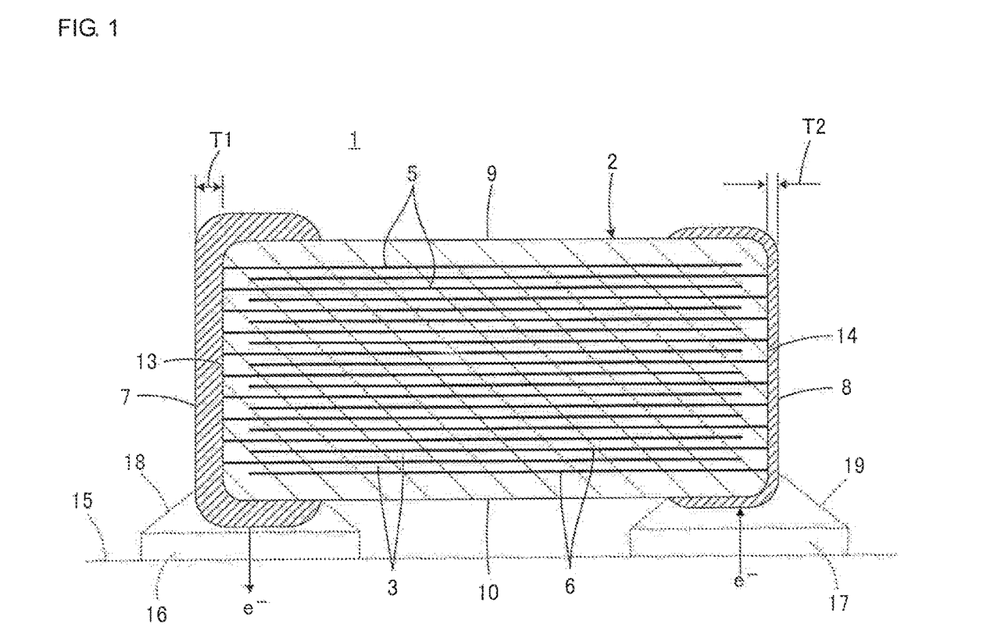
FIG. 1 is a sectional view illustrating a monolithic ceramic capacitor according to a first embodiment of the present invention and a board (indicated by a dotted line) on which the monolithic ceramic capacitor is mounted.

Referring to FIG. 1, a monolithic ceramic capacitor 1 according to a first embodiment of the present invention will be described.

The monolithic ceramic capacitor 1 includes a multilayer body 2 which is a main body. The multilayer body 2 includes a plurality of dielectric ceramic layers 3 and inner electrodes (first inner electrodes 5 and second inner electrodes 6). The plurality of dielectric ceramic layers 3 are stacked on one another. Each of the inner electrodes is disposed along a corresponding one of a plurality of interfaces between the dielectric ceramic layers 3. A first outer electrode 7 and a second outer electrode 8 are respectively disposed at a first position and a second position on a surface of the multilayer body 2, the first and second positions being different positions, the surface of the multilayer body 2 being a surface that extends in a direction in which the dielectric ceramic layers 3 are stacked on one another.

More specifically, the multilayer body 2 has a substantially rectangular-parallelepiped shape having a first principal face 9, a second principal face 10, a first side face, a second side face, a first end face 13, and a second end face 14. The first and second principal faces 9 and 10 oppose each other and extend in a direction of principal faces of the dielectric ceramic layers 3. The first and second side faces, which are two surfaces parallel to a section of the multilayer body 2 illustrated in FIG. 1, oppose each other and extend in a direction in which the dielectric ceramic layers 3 are stacked on one another. The first and second end faces 13 and 14 oppose each other.

The inner electrodes include the first inner electrodes 5 and the second inner electrodes 6 which are alternately disposed in the direction in which the dielectric ceramic layers 3 are stacked on one another. The first inner electrodes 5 extend to the first end face 13 so as to be electrically connected to the first outer electrode 7. The second inner electrodes 6 extend to the second end face 14 so as to be electrically connected to the second outer electrode 8.

A dielectric ceramic containing, for example, $BaTiO_3$, $CaTiO_3$, $SrTiO_3$, or $CaZrO_3$ as a chief constituent thereof can be used as a ceramic material of the dielectric ceramic layers 3. An accessory constituent such as a Mn compound, a Mg compound, a Si compound, a Zr compound, a rare-earth-element compound is added to the dielectric ceramic if necessary.

A metal material containing, for example, Ni, Cu, Ag, or Pd as a chief constituent thereof can be used as a conductive material for the first and second inner electrodes 5 and 6.

The first and second outer electrodes 7 and 8 are formed by applying and baking a conductive paste which contains, for example, Cu, Ni, Ag, Pd, Ag—Pd alloy, or Au as a conductive component thereof onto the first and second end faces 13 and 14 of the multilayer body 2, respectively.

Preferably, primary coating layers of the first and second outer electrodes 7 and 8 are formed by baking. Then, plating is performed onto the primary coating layers. A plating film includes two layers which are, for example, a Ni plating layer and a Sn plating layer disposed on the Ni plating layer. Note that the first and second outer, electrodes 7 and 8 may be formed of a plating film alone or may be formed by curing of a conductive resin.

The monolithic ceramic capacitor 1 is mounted on a board 15 denoted by a dotted line in FIG. 1. More specifically, the board 15 includes an anode land 16 which has an anode potential and a cathode land 17 which has a cathode potential. The first outer electrode 7 is connected to the anode land 16 by solder 18. The second outer electrode 8 is connected to the cathode land 17 by solder 19.

In this way, a structure for mounting the monolithic ceramic capacitor 1 enables the first outer electrode 7 to be supplied with the anode potential and the second outer electrode 8 to be supplied with the cathode potential as indicated by an arrow which illustrates a moving direction of electrons "$e^-$" in FIG. 1.

On the assumption that the above-described mounting structure is used, the monolithic ceramic capacitor 1 has a feature in which the first outer electrode 7 has a thickness T1 that is greater than a thickness T2 of the second outer electrode 8. This feature implements a moisture-resistance reliability improving means that can provide a higher moisture-resistance reliability at an anode which includes the first outer electrode 7 and the first inner electrodes supplied with the anode potential than at a cathode which includes the second outer electrode 8 and the second inner electrodes 6 supplied with the cathode potential.

In this embodiment, the aforementioned moisture-resistance reliability improving means is implemented by a moisture-intrusion suppressing means for making it more difficult for moisture to intrude into an interface between any of the dielectric ceramic layers 3 and at least one of the first outer electrode 7 and the first inner electrodes 5 at the anode than at the cathode. Here, making intrusion of moisture more difficult includes not only preventing intrusion of moisture but also retarding intrusion of moisture into the interface.

Preferably, the first outer electrode 7 has the thickness T1 of about 2 μm or greater on a surface of the multilayer body 2 that extends in a direction in which the dielectric ceramic layers are stacked on one another, that is, on the first end fade 13, and the second outer electrode 8 has the thickness T2 that is about half the thickness T1 of the first outer electrode 7 or less on a surface of the multilayer body 2 that extends in the direction in which the dielectric ceramic layers 3 are stacked on one another, that is, on the second end face 14. The following experiment has been conducted to determine such a preferable range.

Multilayer bodies for monolithic ceramic capacitors which have a length of about 2.0 mm, a width of about 1.25 mm, and a thickness of about 1.25 mm after formation of outer electrodes were prepared. In each of these multilayer bodies, dielectric ceramic layers were formed of a dielectric ceramic containing $BaTiO_3$ as a chief constituent thereof so as to have a thickness of about 2 μm. Inner electrodes contained Ni as a chief constituent thereof and had a thickness of about 1 μm. In addition, outer layer portions, at the respective sides of the multilayer body, where no inner electrodes are disposed had a thickness of about 70 μm. In addition, gaps between each side face of the multilayer body and the corresponding inner electrodes at the respective sides were about 100 μm.

Then, outer electrodes ware formed on the multilayer bodies. During formation of the outer electrodes, sputtering was used to form primary coating layers of the outer electrodes, the primary coating layers each having a thickness of about 0.9 μm or less. Specifically, an appropriate mask was applied onto the multilayer body so as to expose portions where the outer electrodes were to be formed. In this state, sputtering was performed using Cu as a sputtering-target material under sputtering conditions of an applied power of 2 kW, a degree of vacuum of 3 Pa, and an Ar gas flow rate of 150 sccm. In this way, outer-electrode primary coating layers having thicknesses of about 0.1 μm, 0.4 μm, and 0.9 μm were formed.

In addition, multilayer bodies not subjected to sputtering and not including primary coating layers of the outer electrodes were also prepared.

Dip coating and baking of a conductive paste were used in order form outer-electrode primary coating layers having a thickness of about 1.9 μm or greater. Specifically, a conductive paste containing Cu as a chief constituent thereof was applied onto a surface plate so as to form a conductive paste film having a certain thickness. Then, each multilayer body fixed by a holder was dipped from above the conductive paste film thus formed. In this way, the conductive paste to serve as outer electrodes was applied onto the multilayer body. Then, the multilayer body having the conductive layer thereon was treated by heat in a conveyor belt furnace at a highest temperature of 950° C. so as to form outer-electrode primary coating layers having thicknesses of about 1.9 μm, 3.9 μm, 7.9 μm, 15.9 μm, 31.9 μm, 63.9 μm, and 127.9 μm.

Then, a Ni film was formed on the primary coating layer formed in the above-described manner by spattering or by coating and baking. A Sn film was formed on the Ni film. The Ni film and the Sn film each had a thickness of about 50 nm.

In the above-described manner, eleven thicknesses of about 0.1 μm, 0.2 μm, 0.5 μm, 1 μm, 2 μm, 4 μm, 8 μm, 16 μm, 32 μm, 64 μm, and 128 μm can be obtained as the total thickness of the primary coating layer, the Ni film, and the Sn film, that is, the thickness of the outer electrodes. Accordingly, 121 (=11×11) sample sets were fabricated in which the thickness of the first outer electrode and the thickness of the second outer electrode are each selected from among eleven thicknesses.

The moisture-resistance reliability was evaluated for 36 monolithic ceramic capacitor samples for each of 121 sample sets by applying a voltage of about 6.3 V to the monolithic ceramic capacitor samples so that the first outer electrode is supplied with an anode potential and the second outer electrode is supplied with a cathode potential in an environment of a temperature of about 125° C., a relative humidity of 95%, and a gage pressure of 0.1 MPa. It was determined that a sample having a logarithmic value (log IR) of insulation resistance (IR) that has decreased from a value obtained immediately after the start of this evaluation test by two orders of magnitude or greater has failed, and the Weibull plot was applied to a time to failure. Samples having a time to failure of less than 72 hours were evaluated to be unsatisfactory, whereas samples that did not fail even after 72 hours were evaluated to be satisfactory.

As a result, samples in which the thickness of the first outer electrode was made greater than the thickness of the second outer electrode and was about 2 μm or greater were evaluated to be satisfactory even if the thickness of the second outer electrode thereof was made half the thickness of the first outer electrode or less. Although samples in which the thickness of the first outer electrode was about 2 μm or greater and the thickness of the second outer electrode was substantially equal to the thickness of the first outer electrode were also evaluated to be satisfactory, such samples are not within the scope of the present invention.

The above-described evaluation test is carried out under a significantly severe environment. Thus, it is considered that samples that do not fail after 72 hours have excellent moisture-resistance reliability.

As described above, according to the first embodiment, an increased thickness of the first outer electrode 7 can makes it more difficult for moisture existing outside to reach the first end face 13 of the multilayer body 2 to which the first inner electrodes 5 extend. It is presumed that moisture-resistance reliability consequently improves at the anode. The moisture-intrusion suppressing means is employed only at the first outer electrode 7, and there is no need to increase the thickness of the second outer electrode 8. This configuration thus can contribute to size reduction of the monolithic ceramic capacitor 1.

As a modification of the first embodiment or instead of or in addition to the method according to the first embodiment in which the moisture-intrusion suppressing means such as a configuration in which the first outer electrode 7 has a greater thickness than the second outer electrode 8 is employed, a moisture-intrusion suppressing means such as a configuration in which the first outer electrode 7 has a lower water vapor transmission rate than the second outer electrode 8 may be employed. A lower water vapor transmission rate of the outer electrode makes it more difficult for moisture existing outside to reach a surface of the multilayer body 2 to which the inner electrodes extend. It is confirmed that the monolithic ceramic capacitor 1 can have excellent moisture-resistance reliability when the first outer electrode 7 serving as the anode has a water vapor transmission rate of about $5\times10^{-5}$ g/(m$^2$·day) or less even if the second outer electrode 8 serving as the cathode has a water vapor transmission rate exceeding $5\times10^{-5}$ (m$^2$·day).

Note that the water vapor transmission rate can be controlled by adjusting a thickness of a reaction layer described in Japanese Unexamined Patent Application Publication No. 2000-40635, a porosity rate described in Japanese Unexamined Patent Application Publication No. 2000-49034, or a glass distribution area ratio described in Japanese Unexamined Patent Application Publication No. 2000-77258.

In addition, a measure may be taken using an amount of intruding water vapor instead of the water vapor transmission rate. That is, a moisture-intrusion suppressing means such as a configuration in which the first outer electrode 7 has a smaller amount of intruding water vapor than the second outer electrode 8 may be employed. As the amount of intruding water vapor of the outer electrode decreases, it becomes more difficult for moisture existing outside to reach a surface of the multilayer body to which the inner electrodes extend. It is confirmed that the monolithic ceramic capacitor 1 can have excellent moisture-resistance reliability when the first outer electrode 7 serving as the anode has an amount of intruding water vapor of about 40 μg or less even if the second outer electrode 8 serving as the cathode has an amount of intruding water vapor exceeding 40 μg.

In addition, as a further modification of the first embodiment, a water-repellent process for applying a water repellent to the first outer electrode 7 may be performed after the primary coting layer is formed by baking before the plating film is formed. Alternatively, a sealing process may be performed on the first end face 13 by using a glass film, for example.

Further, as an exemplary improvement of outer electrodes as in the first embodiment, a moisture-resistance reliability improving means that can provide a higher moisture-resistance reliability at the anode than at the cathode may be implemented by using a noble metal for the first outer electrode 7 and a base metal for the second outer electrode 8.

Moreover, the solubility of glass to water or water soluble flux may be focused on, and a moisture-resistance reliability improving means that can provide a higher moisture-resistance reliability at the anode than at the cathode may be implemented by using, as the glass contained in the first outer electrode 7, a material having a lower solubility to water or water soluble flux than that used as the glass contained in the second outer electrode 8.

Further, it is expected that scratches are caused on the outer electrodes by handling. Thus, hardness of a metal is focused on, and a moisture-resistance reliability improving means that can provide a higher moisture-resistance reliability at the anode than at the cathode may implemented by using, as a metal contained in the first outer electrode 7, a metal having a higher hardness than that used as a metal contained in the second outer electrode 8.

Figure 2:
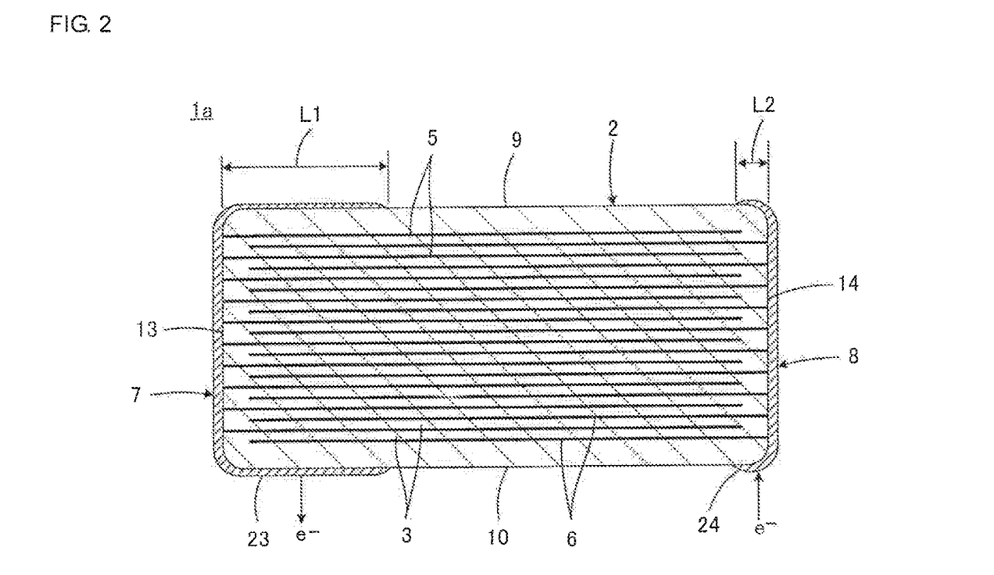
FIG. 2 is a sectional view of a monolithic ceramic capacitor according to a second embodiment of the present invention.

Referring to FIG. 2, a monolithic ceramic capacitor 1a according to a second embodiment of the present invention will be described. In FIG. 2, components equivalent to the components illustrated in FIG. 1 are denoted by similar reference numerals so as to omit a duplicate description.

In the monolithic ceramic capacitor 1a, the first outer electrode 7 includes an adjacent-surface extending portion 23 that is formed so as to extend from the first end face 13 of the multilayer body 2 to the first and second principle surfaces 9 and 10 and the first and second side faces that are adjacent to the first end face 13. The second outer electrode 8 includes an adjacent-surface extending portion 24 that is formed so as to extend from the second end face 14 of the multilayer body 2 to the first and second principal faces 9 and 10 and the first and second side faces that are adjacent to the second end face 14. Note that the monolithic ceramic capacitor 1 described above also has this configuration.

The second embodiment has a feature in which the adjacent-surface extending portion 23 of the first outer electrode 7 has a length L1 that is greater than a length L2 of the adjacent-Surface extending portion 24 of the second outer electrode 8. This feature implements a moisture-resistance reliability improving means, more specifically, a moisture-intrusion suppressing means. That is, the increased length L1 of the adjacent-surface extending portion 23 of the first outer electrode 7 increases a distance from the edge of the adjacent-surface extending portion 23 to the first end face 13 of the multilayer body 2 to which the first inner electrodes 5 extend. This increased distance can suppress or retard intrusion of moisture into interfaces between the dielectric ceramic layers 3 and the first inner electrodes 5.

According to the second embodiment, increasing the length L1 of the adjacent-surface extending portion 23 of the first outer electrode 7 can exert a sufficient effect, and there is no need to increase the length L2 of the adjacent-surface extending portion 24 of the second outer electrode 8. This configuration thus can contribute to size reduction of the monolithic ceramic capacitor 1a and can reduce the material cost for forming the first outer electrode 7 and the second outer electrode 8.

Figure 3:
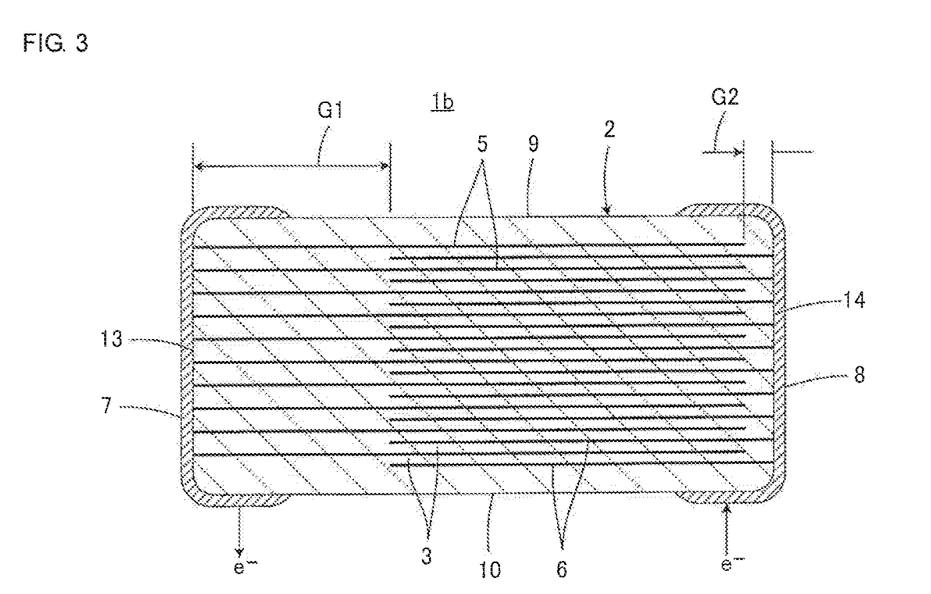
FIG. 3 is a sectional view of a monolithic ceramic capacitor according to a third embodiment of the present invention.

Referring to FIG. 3, a monolithic ceramic capacitor 1b according to a third embodiment of the present invention will be described. In FIG. 3, components equivalent to the components illustrated in FIG. 1 are denoted by similar reference numerals so as to omit a duplicate description.

In the monolithic ceramic capacitor 1b, the first end face 13 and the second inner electrodes 6 are disposed with a first length-direction gap G1 interposed therebetween. The second end face 14 and the first inner electrodes 5 are disposed with a second length-direction gap G2 interposed therebetween. The monolithic ceramic capacitor 1 described above also has this configuration.

The third embodiment has a feature in which the first length-direction gap G1 is greater than the second length-direction gap G2. This feature implements a moisture-resistance reliability improving means. That is, by making the first length-direction gap G1 greater than the second length-direction gap G2, it is possible to increase a distance from the first end face 13 to a position at which the first inner electrodes 5 and the second inner electrodes oppose each other and to which a voltage of a certain level or higher is applied, along interfaces between the first inner electrodes 5 and the dielectric ceramic layers 3. A certain level of voltage or higher is needed to generate hydrogen ions which decrease moisture-resistance reliability. The third embodiment however can make it more difficult for moisture to reach a position to which a voltage of the certain level or greater which can cause generation of hydrogen ions is applied or can increase the time taken for moisture to reach the position even if moisture intrudes from the first end face 13.

Preferably, a ratio of a dimension of the first length-direction gap G1 to a dimension of the second length-direction gap G2 is greater than 6. Note that this ratio is decided based on a diffusion coefficient of water vapor.

Figure 4A:
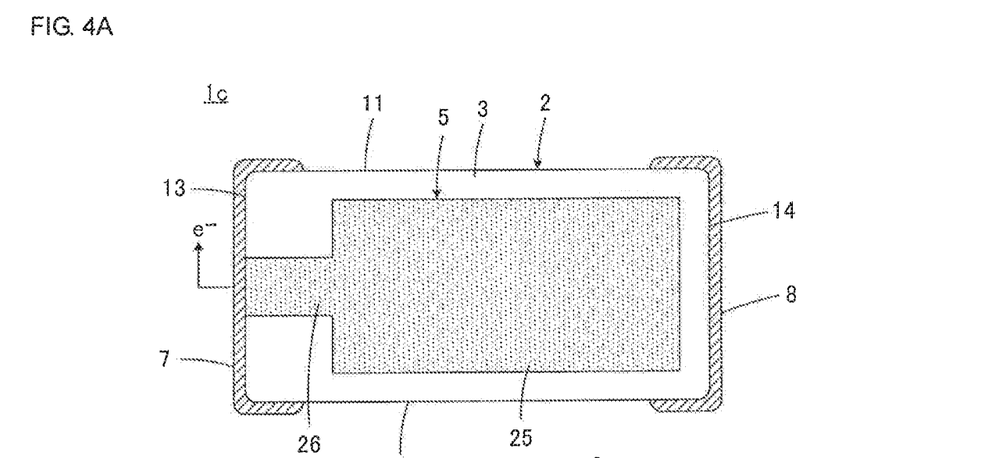
FIG. 4A illustrates a section where a first inner electrode is disposed in a monolithic ceramic capacitor according to a fourth embodiment of the present invention.
Figure 4B:
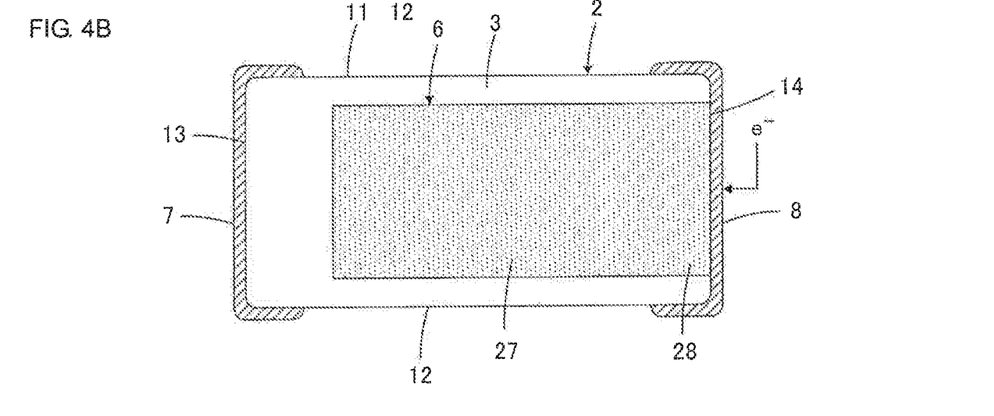
FIG. 4B illustrates a section where a second inner electrode is disposed in the monolithic ceramic capacitor according to the fourth embodiment of the present invention.

Referring to FIGS. 4A and 4B, a monolithic ceramic capacitor 1c according to a fourth embodiment of the present invention will be described. In FIGS. 4A and 4B, components equivalent to the components illustrated in FIG. 1 are denoted by similar reference numerals so as to omit a duplicate description. Note that FIGS. 4A and 4B further illustrate a first side face 11 and a second side face 12 of the multilayer body 2.

The monolithic ceramic capacitor 1c has a feature in structures of the first inner electrodes 5 and the second inner electrodes 6. The first inner electrodes 5 each have a capacitance forming portion 25 that opposes the second inner electrode 6 with the dielectric ceramic layer interposed therebetween and a lead portion 26 that extends from the capacitance forming portion 25 and is connected to the first outer electrode 7. The second inner electrodes 6 each have a capacitance forming portion 27 that opposes the first inner electrode 5 with the dielectric ceramic layer 3 interposed therebetween and a lead portion 28 that extends from the capacitance forming portion 27 and is connected to the second outer electrode 8. This configuration is the same as that of the monolithic ceramic capacitor 1 described above.

The monolithic ceramic capacitor 1c has a feature in which the lead portion 26 of the first inner electrodes 5 has a smaller width than the lead portion 28 of the second inner electrodes 6. This feature implements a moisture-resistance reliability improving means, more specifically, a moisture-intrusion suppressing means. That is, a reduced width of the lead portion 26 of the first inner electrodes 5 can suppress intrusion of moisture from the first end face 13 of the multilayer body 2 to which the first inner electrodes 5 extend by a larger degree. In this case, it is also effective to make the narrow lead portion 26 of the first inner electrodes 5 longer.

Note that the shapes of the lead potions 26 and 28 are merely illustrative and thus can be changed variously as long as their functions are maintained.

As an exemplary improvement of inner electrodes as in the fourth embodiment, a metal having a lower coefficient of linear expansion than a metal contained in the second inner electrodes 6 is used as a metal contained in the first inner electrodes 5 so as to make electrode defects that can occur at the first inner electrodes 5 less likely. In this way, a moisture-resistance reliability improving means, more specifically, a moisture-intrusion suppressing means that suppresses intrusion of water vapor into interfaces between the first inner electrodes 5 and the dielectric ceramic layers 3 may be implemented.

In addition, as another exemplary improvement of inner electrodes, an amount of ceramic component in common with dielectric ceramic contained in the inner electrode may be focused on. That is, an amount of ceramic component contained in the first inner electrodes 5 is made greater than an amount of ceramic component contained in the second inner electrode 6 so as to make electrode defects that can occur at the first inner electrodes 5 less likely as in the above-described exemplary improvement. In this way, a moisture-resistance reliability improving means, more specifically, a moisture-intrusion suppressing means that suppresses intrusion of water vapor into interfaces between the first inner electrodes 5 and the dielectric ceramic layers 3 may be implemented.

In addition, as still another exemplary improvement of inner electrodes, a noble metal is used for the first inner electrodes 5 and a base metal is used for the second inner electrodes 6. In this way, a moisture-resistance reliability improving means that can provide a higher moisture-resistance reliability at an anode than at a cathode may be implemented.

Furthermore, as still another exemplary improvement of inner electrodes, an acid resistance of the first inner electrodes 5 is made higher than that of the second inner electrodes 6. In this way, a moisture-resistance reliability improving means that can provide a higher moisture-resistance reliability at an anode than at a cathode may be implemented.

Figure 5:
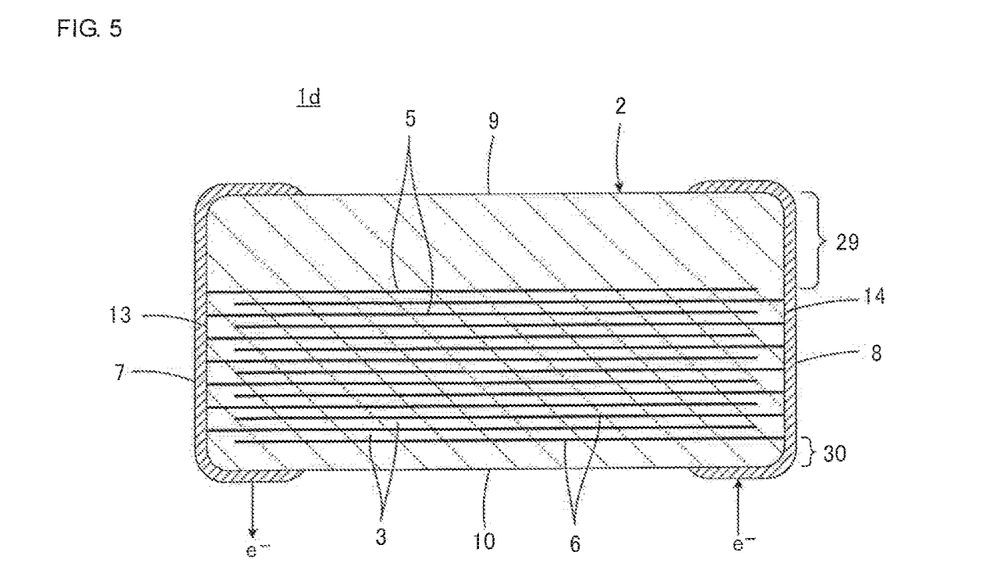
FIG. 5 is a sectional view illustrating a monolithic ceramic capacitor according to a fifth embodiment of the present invention.

Referring to FIG. 5, a monolithic ceramic capacitor 1d according to a fifth embodiment of the present invention will be described. In FIG. 5, components equivalent to the components illustrated in FIG. 1 are denoted by similar reference numerals so as to omit a duplicate description.

In the monolithic ceramic capacitor 1d, the dielectric ceramic layers 3 include layers that form a first outer layer portion 29 disposed at one end in the stacking direction of the multilayer body 2 and layers that form a second outer layer portion 30 disposed at the other end in the stacking direction of the multilayer body 2. The first inner electrode 5 is disposed to be in contact with the first outer layer portion 29, whereas the second inner electrode 6 is disposed to be in contact with the second outer layer portion 30. The monolithic ceramic capacitor 1 described above also has this configuration.

The monolithic ceramic capacitor 1d has a feature in which the first outer layer portion 29 has a greater thickness than the second outer layer portion 30. This feature implements a moisture-resistance reliability improving means. That is, by making the thickness of the first outer layer portion. 29 greater than the thickness of the second outer layer portion 30, it is possible to increase a distance from the edge of the first outer electrode 7 to a position on the first end face 13 to which the outermost first inner electrode 5 extends. This configuration can consequently suppress or retard intrusion of moisture into interfaces between the dielectric ceramic layers 3 and the first inner electrodes 5. Note that the second outer layer portion 30 involves no issue relating to generation of hydrogen ions because the second inner electrode 6 serving as the cathode is disposed at the outermost position.

Figure 6:
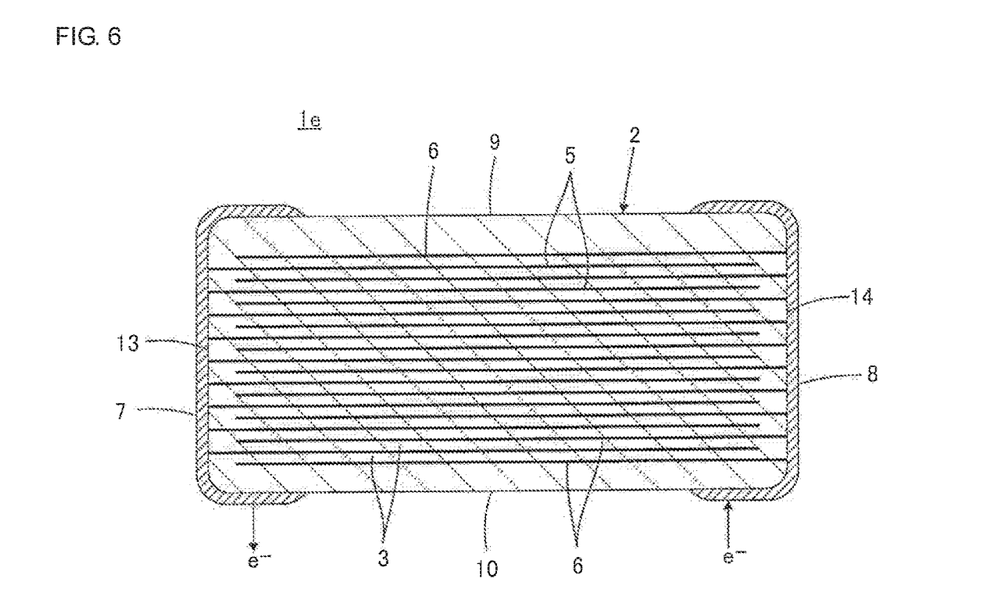
FIG. 6 is a sectional view illustrating a monolithic ceramic capacitor according to a sixth embodiment of the present invention.

Referring to FIG. 6, a monolithic ceramic capacitor 1e according to a sixth embodiment of the present invention will be described. In FIG. 6, components equivalent to the components illustrated in FIG. 1 are denoted by similar reference numerals so as to omit a duplicate description.

The monolithic ceramic capacitor 1e has a feature in which inner electrodes disposed at respective ends in the stacking direction are the second inner electrodes 6. This feature implements a moisture-resistance reliability improving means.

That is, the second inner electrodes 6 disposed outermost positions can not only suppress or retard intrusion of moisture into interfaces between the dielectric ceramic layers 3 and the first inner electrodes 5 but also avoid an issue relating to generation of hydrogen ions even if moisture intrudes along the second inner electrodes 6 because the second inner electrodes 6 disposed at outermost positions serve as the cathode.

The sixth embodiment can also implement a following embodiment. It is conceivable to increase a porosity rate of the dielectric ceramic layers 3 that form outer layer portions of the multilayer body 2 in order to make the monolithic ceramic capacitor less likely to crack or chip off and thereby improve mechanical strength of the monolithic ceramic capacitor. This configuration, on the other hand, raises concerns of intrusion of moisture via the outer layer portions. However, when the second inner electrodes 6 serving as the cathode that is free from severe moisture intrusion issues are disposed at outermost positions as described above, intrusion of moisture becomes no longer problematic and a configuration for improving the mechanical strength of the monolithic ceramic capacitor 1e can be employed.

Figure 7:
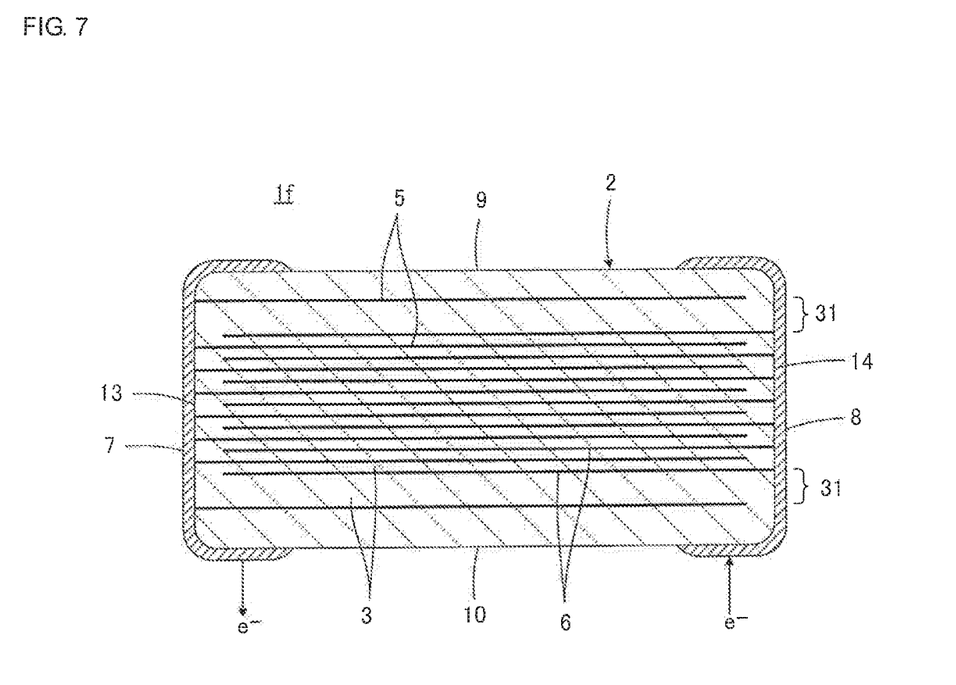
FIG. 7 is a sectional view illustrating a monolithic ceramic capacitor according to a seventh embodiment of the present invention.

Referring to FIG. 7, a monolithic ceramic capacitor 1f according to a seventh embodiment of the present invention, will be described. In FIG. 7, components equivalent to the components illustrated in FIG. 1 are denoted by similar reference numerals so as to omit a duplicate description.

The monolithic ceramic capacitor 1f has a feature in which a thickness of the dielectric ceramic layer 3 of capacitor units 31 disposed at respective outermost positions in the stacking direction among a plurality of capacitor units each including the first inner electrode 5 and the second inner electrode 6 that oppose each other and the dielectric ceramic layer 3 disposed therebetween is greater than a thickness of the dielectric ceramic layer 3 of the other capacitor units. This feature implements a hydrogen-ion generation suppressing means.

A greater amount of voltage among voltage applied across the first inner electrodes 5 and the second inner electrodes 6 are stored in the thicker dielectric ceramic layers 3. This consequently makes it more difficult for voltage that causes electrolysis that can generate hydrogen ions to be applied to the first inner electrodes 5 that serve as the anode. Accordingly, hydrogen ions are less likely to be generated as the dielectric ceramic layer 3 becomes thicker.

In the monolithic ceramic capacitor if, the capacitor units 31 disposed at the respective outermost positions where intrusion of moisture is problematic suppress generation of hydrogen ions and thus can improve moisture-resistance reliability.

Note that the dielectric ceramic layers 3 of the capacitor units 31 disposed at the respective outermost positions in the stacking direction are made thicker in the illustrated monolithic ceramic capacitor if for ease of illustration. However, the dielectric ceramic layers 3 of several capacitor units 31 disposed near the outermost positions may also be made thicker.

Referring to FIGS. 8A to 8E, a monolithic ceramic capacitor 41 according to an eighth embodiment of the present invention will be described. The monolithic ceramic capacitor 41 is of a multi-port type.

The monolithic ceramic capacitor 41 includes a multilayer body 42 which is a main body. The multilayer body 42 includes a plurality of dielectric ceramic layers 43 that are stacked on one another and first inner electrodes 45a to 45d and second inner electrodes 46 each disposed along a corresponding one of a plurality of interfaces between the dielectric ceramic layers 43.

The multilayer body 42 has a substantially rectangular-parallelepiped shape having a first principal face and a second principal face (which are two surfaces parallel to sections of the multilayer body 42 illustrated in FIGS. 8A to 8E) that oppose each other and that extend in a direction of principal faces of the dielectric ceramic layers 43, a first side face 49 and a second side face 50 that oppose each other and that extend in a direction in which the dielectric ceramic layers 43 are stacked on one another, and a first end face 51 and a second end face 52 that oppose each other.

Two first outer electrodes 53a and 53b and two second outer electrodes 54 are alternately disposed on the first side face 49 of the multilayer body 42, and two first outer electrodes 53c and 53d and two second outer electrodes 54 are alternately disposed on the second side face 50 of the multilayer body 42.

Figure 8A:
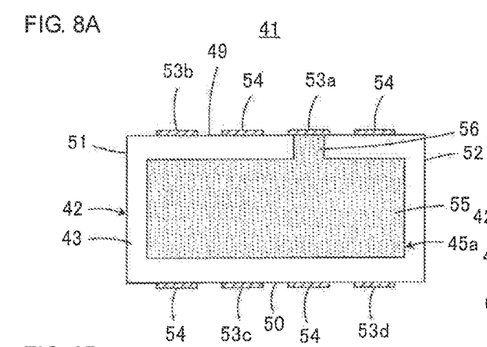
FIGS. 8A to 8D illustrate sections where first inner electrodes are disposed in a monolithic ceramic capacitor according to an eighth embodiment of the present invention.
Figure 8B:
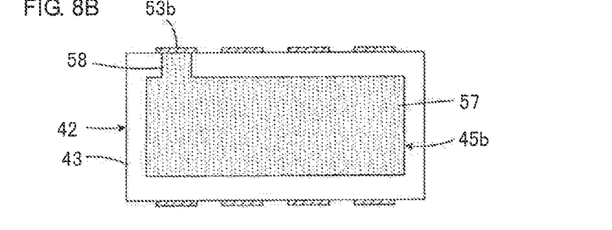
Figure 8C:
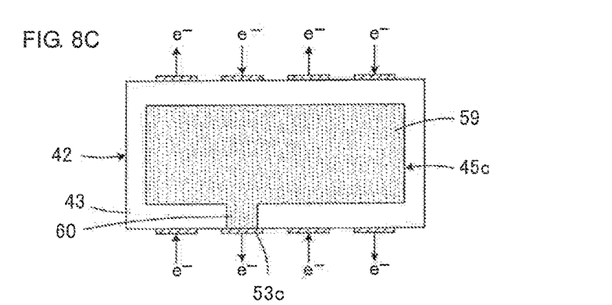
Figure 8D:
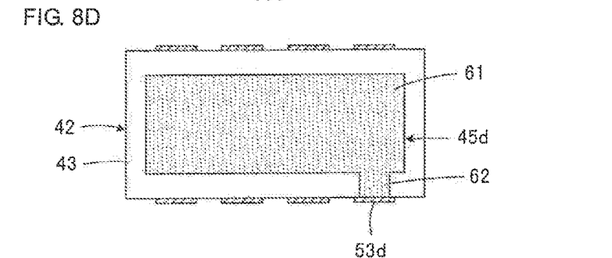
Figure 8E:
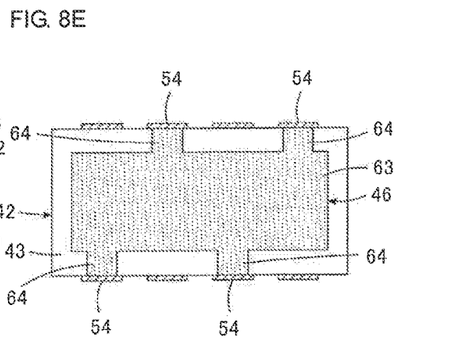
FIG. 8E illustrates a section where a second inner electrode is disposed in the monolithic ceramic capacitor according to the eighth embodiment of the present invention.

The order in which the first inner electrodes 45a to 45d and the second inner electrodes 46 are stacked on one another in the multilayer body 42 is selected to be an order of the first inner electrode 45a illustrated in FIG. 8A, the second inner electrode 46 illustrated in FIG. 8E, the first inner electrode 45b illustrated in FIG. 8E, the second inner electrode 46 illustrated in FIG. 8E, the first inner electrode 45c illustrated in FIG. 8C, the second inner electrode 46 illustrated in FIG. 8E, the first inner electrode 45d illustrated in FIG. 8D, and the second inner electrode 46 illustrated in FIG. 8E, for example.

The first inner electrode 45a illustrated in FIG. 8A includes a capacitance forming portion 55 that opposes the second inner electrode 46 and a lead portion 56 that extends from the capacitance forming portion 55 and is connected to the first outer electrode 53a.

The first inner electrode 45b illustrated in FIG. 8B includes a capacitance forming portion 57 that opposes the second inner electrode 46 and a lead Portion 58 that extends from the capacitance forming portion 57 and is connected to the first outer electrode 53b.

The first inner electrode 45c illustrated in FIG. 8C includes a capacitance forming portion 59 that opposes the second inner electrode 46 and a lead portion 60 that extends from the capacitance forming portion 59 and is connected to the first outer electrode 53c.

The first inner electrode 45d illustrated in FIG. 8D includes a capacitance forming portion 61 that opposes the second inner electrode 46 and a lead portion 62 that extends from the capacitance forming portion 61 and is connected to the first outer electrode 53d.

The second inner electrode 46 illustrated in FIG. 8E includes a capacitance forming portion 63 that opposes any one of the first inner electrodes 45a to 45d and four lead portions 64 each of which extends from the capacitance forming portion 63 and is connected to a corresponding one of the four second outer electrodes 54.

The monolithic ceramic capacitor 41 has a feature in which the number of lead portions 56, 58, 60, and 62 of the first inner electrodes 45a, 45b, 45c, and 45d is less than the number of lead portions 64 of the second inner electrodes 46. This feature implements a moisture-resistance reliability improving means, more specifically, a moisture-intrusion suppressing means. That is, a decreased number of lead portions 56, 58, 60, and 62 of the first inner electrodes 45a to 45d can suppress intrusion of moisture from the first side face 49 and the second side face 50 of the multilayer body 42 to which the first inner electrodes 45a to 45d extend.

In the monolithic ceramic capacitor 41 illustrated in FIGS. 8A to 8E, the first inner electrodes 45a to 45d each include one lead portion 56, 58, 60, or 62. However, the first inner electrodes 45a to 45d may each include a plurality of lead portions as long as a condition that the number of lead portions of the first inner electrodes 45a to 45d is less than the number of lead portions 64 of the second inner electrodes 46 is met.

In addition, the monolithic ceramic capacitor 41 according to the eighth embodiment includes eight outer electrodes 53a to 53d and 54. However, the number of outer electrodes can be changed to any given value in accordance with the usage of the monolithic ceramic capacitor 41. This configuration is also applicable to array-type monolithic ceramic capacitors.

Although not described here, some of the configurations described in the above embodiments can be employed in the eighth embodiment as appropriate.

Figure 9:
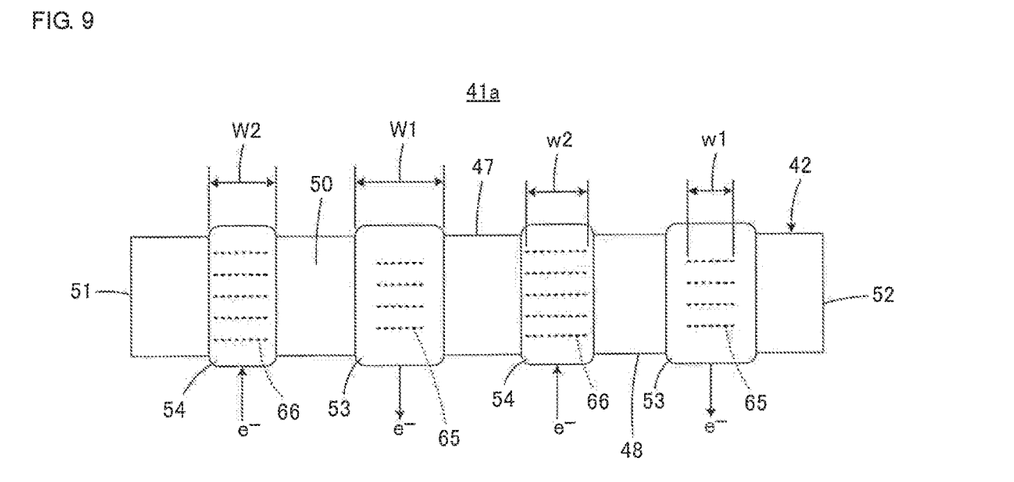
FIG. 9 is a side view of a monolithic ceramic capacitor according to a ninth embodiment of the present invention.

Referring to FIG. 9, a monolithic ceramic capacitor 41a according to a ninth embodiment of the present invention will be described in FIG. 9, components equivalent to the components illustrated in FIGS. 8A to 8E are denoted by similar reference numerals so as to omit a duplicate description. Note that FIG. 9 further illustrates a first principal face 47 and a second principal face 48 of the multilayer body 42.

The monolithic ceramic capacitor 41a is also of a multi-port type. The monolithic ceramic capacitor 41a has a feature in which a first outer electrode 53 has a width W1 that is greater than a width W2 of the second outer electrode 54. This feature implements a moisture-resistance reliability improving means, more specifically, a moisture-intrusion suppressing means. Further, preferably, a width w1 of an exposed end of a lead portion 65 of the first inner electrode is less than a width-direction dimension w2 of an exposed end of a lead portion 66 of the second inner electrode.

The above-described configuration increases a distance from the edge of the first outer electrode 53 to the exposed end of the lead portion 65 of the first inner electrode and thus can suppress or retard intrusion of moisture into interfaces between the dielectric ceramic layers 43 and the first inner electrodes.

Note that the monolithic ceramic capacitor 41a illustrated in FIG. 9 does not necessarily have the feature regarding a relationship between the number of lead portions 56, 58, 60, and 62 of the first inner electrodes 45a to 45d and the number of lead portions 64 of the second inner electrodes 46 illustrated in FIGS. 8A to 8E.

While preferred embodiments of the invention have been described above, it is to be understood that variations and modifications will be apparent to those skilled in the art without departing from the scope and spirit of the invention.

The scope of the invention, therefore, is to be determined, solely by the following claims.

What is claimed is:

1. A monolithic ceramic capacitor comprising:
a multilayer body including a plurality of dielectric ceramic layers that are stacked on one another and inner electrodes each disposed along a corresponding one of a plurality of interfaces between the dielectric ceramic layers, wherein the multilayer body has a substantially rectangular-parallelepiped shape having a first principal face and a second principal face that oppose each other and that extend in a direction of principal faces of the dielectric ceramic layers, a first side face and a second side face that oppose each other and that extend in the stacking direction in which the dielectric ceramic layers are stacked on one another, and a first end face and a second end face that oppose each other and that each connect the first principal face, the second principal face, the first side face and the second side face to each other;
a first outer electrode disposed on the first end face of the multilayer body and a second outer electrode disposed on the second end face of the multilayer body,
the inner electrodes including first inner electrodes and second inner electrodes that are alternately arranged in the stacking direction, wherein the first inner electrodes extend to a first position at the first end face and are electrically connected to the first outer electrode and the second inner electrodes extend to a second position at the second end face and are electrically connected to the second outer electrode, and the first position and the second position oppose each other,
the first outer electrode and the first inner electrodes being supplied with an anode potential and the second outer electrode and the second inner electrodes being supplied with a cathode potential when the monolithic ceramic capacitor is mounted and in use; and
moisture-resistance reliability improving means for providing a higher moisture-resistance reliability at an anode which includes the first outer electrode and the first inner electrodes supplied with the anode potential than at a cathode which includes the second outer electrode and the second inner electrodes supplied with the cathode potential.

2. The monolithic ceramic capacitor according to claim 1, wherein the moisture-resistance reliability improving means includes moisture-intrusion suppressing means for more highly preventing moisture from intruding into an interface between any of the dielectric ceramic layers and at least one of the first outer electrode and the first inner electrodes at the anode than intruding into an interface between any of the dielectric ceramic layers and at least one of the second outer electrode and the second inner electrodes at the cathode.

3. The monolithic ceramic capacitor according to claim 2, wherein the moisture-intrusion suppressing means includes a configuration in which the first outer electrode has a thickness that is greater than a thickness of the second outer electrode.

4. The monolithic ceramic capacitor according to claim 3, wherein the first outer electrode has a first thickness of 2 μm or greater on the surface of the multilayer body that extends in the stacking direction, and
the second outer electrode has a second thickness that is half the thickness of the first outer electrode or less on the surface of the multilayer body that extends in the stacking direction.

5. The monolithic ceramic capacitor according to claim 2, wherein the moisture-intrusion suppressing means includes a configuration in which the first outer electrode has a water vapor transmission rate that is lower than a water vapor transmission rate of the second outer electrode.

6. The monolithic ceramic capacitor according to claim 2, wherein the moisture-intrusion suppressing means includes a configuration in which the first outer electrode has an amount of intruding water vapor that is less than an amount of intruding water vapor of the second outer electrode.

7. The monolithic ceramic capacitor according to claim 2, wherein
the first end face and the second inner electrodes are disposed with a first length-direction gap interposed therebetween, and the second end face and the first inner electrodes are disposed with a second length-direction gap interposed therebetween, and
the moisture-intrusion suppressing means includes a configuration in which the first length-direction gap is greater than the second length-direction gap.

8. The monolithic ceramic capacitor according to claim 7, wherein a ratio of a dimension of the first length-direction gap to a dimension of the second length-direction gap is greater than 6.

9. The monolithic ceramic capacitor according to claim 2, wherein
the first outer electrode includes a plurality of first outer electrodes and the second outer electrode includes a plurality of second outer electrodes,
each of the inner electrodes has a capacitance forming portion that oppose another inner electrode with a corresponding one of the dielectric ceramic layers interposed therebetween,
each of the first inner electrodes has at least one first lead portion that is connected to at least one of the plurality of first outer electrodes,
each of the second inner electrodes has a plurality of second lead portions each of which is connected to a corresponding one of the plurality of second outer electrodes, and
the moisture-intrusion suppressing means includes a configuration in which the number of first lead portions is less than the number of second lead portions.

10. The monolithic ceramic capacitor according to claim 1, wherein the moisture-resistance reliability improving means includes hydrogen-ion generation suppressing means for making generation of hydrogen ions due to electrolysis of water that has intruded into an interface between any of the dielectric ceramic layers and at least one of the first outer electrode and the first inner electrodes less likely to occur at the anode than generation of hydrogen ions due to electrolysis of water that has intruded into an interface between any of the dielectric ceramic layers and at least one of the second outer electrode and the second inner electrodes at the cathode.

11. The monolithic ceramic capacitor according to claim 1, wherein the moisture-resistance reliability improving means includes a configuration in which both the inner electrodes disposed at each end of the stacking direction are the second inner electrodes.

12. A structure for mounting the monolithic ceramic capacitor according to claim 1, the monolithic ceramic capacitor being mounted such that the first outer electrode is supplied with the anode potential and the second outer electrode is supplied with the cathode potential.

13. A monolithic ceramic capacitor comprising:
a multilayer body including a plurality of dielectric ceramic layers that are stacked on one another and inner electrodes each disposed along a corresponding one of a plurality of interfaces between the dielectric ceramic layers;
a first outer electrode and a second outer electrode disposed at a first position and a second position on a surface of the multilayer body, respectively, the first position and the second position being different positions, the surface being a surface extending in a stacking direction in which the dielectric ceramic layers are stacked on one another,
the inner electrodes including first inner electrodes and second inner electrodes that are alternately arranged in the stacking direction and that extend to the first position and the second position so as to be electrically connected to the first outer electrode and the second outer electrode, respectively, and
the first outer electrode having a first water vapor transmission rate that is lower than a second water vapor transmission rate of the second outer electrode.

* * * * *